United States Patent
Clemmer et al.

(10) Patent No.: US 11,721,214 B2
(45) Date of Patent: Aug. 8, 2023

(54) PARKING SENSOR DEVICE FOR DETERMINING OCCUPANCY OF A PARKING SPACE

(71) Applicant: Eleven-X Incorporated, Waterloo (CA)

(72) Inventors: Jeff Clemmer, New Dundee (CA); Chris Snyder, Waterloo (CA); Brandon Davies, Kitchener (CA); Jonathan Swoboda, Waterloo (CA)

(73) Assignee: ELEVEN-X INCORPORATED, Waterloo (CA)

( * ) Notice: Subject to any disclaimer, the term of this patent is extended or adjusted under 35 U.S.C. 154(b) by 0 days.

(21) Appl. No.: 17/446,705

(22) Filed: Sep. 1, 2021

(65) Prior Publication Data

US 2022/0076576 A1 Mar. 10, 2022

Related U.S. Application Data

(60) Provisional application No. 62/706,728, filed on Sep. 4, 2020.

(51) Int. Cl.
*G08G 1/14* (2006.01)
*G01V 3/08* (2006.01)
(Continued)

(52) U.S. Cl.
CPC .............. *G08G 1/141* (2013.01); *G01S 13/04* (2013.01); *G01S 13/86* (2013.01); *G01V 3/081* (2013.01)

(58) Field of Classification Search
None
See application file for complete search history.

(56) References Cited

U.S. PATENT DOCUMENTS

| 10,104,454 | B2 * | 10/2018 | Sullivan | H04W 4/44 |
| 2014/0343891 | A1 * | 11/2014 | Becker | G08G 1/147 |
| | | | | 702/150 |

(Continued)

FOREIGN PATENT DOCUMENTS

| CN | 107680399 A | * | 2/2018 | | G08G 1/042 |
| CN | 110364017 A | * | 10/2019 | | G01S 13/91 |

(Continued)

OTHER PUBLICATIONS

International Search Report and Written Opinion issued in connection with International Application No. PCT/CA2021/051211, International Searching Authority, dated Nov. 5, 2021.

*Primary Examiner* — Fekadeselassie Girma
(74) *Attorney, Agent, or Firm* — Dentons Canada LLP

(57) ABSTRACT

Disclosed is a parking sensor device for determining occupancy of a parking space. The parking sensor device has a magnetometer sensor configured to detect a magnetic field, and a radar sensor configured to perform at least one radar scan to detect presence of an object. In accordance with an embodiment of the disclosure, the parking sensor device has control circuitry configured to determine occupancy of the parking space based on the magnetic field and the at least one radar scan. Utilizing this particular combination of sensor input can help to improve accuracy and reliability of determining occupancy of the parking space, especially when compared to existing approaches that utilize a single sensor such as a magnetometer sensor. The parking sensor device also has an output for conveying occupancy of the parking space.

18 Claims, 14 Drawing Sheets

(51) Int. Cl.
  *G01S 13/86* (2006.01)
  *G01S 13/04* (2006.01)

(56) References Cited

U.S. PATENT DOCUMENTS

| | | | | |
|---|---|---|---|---|
| 2015/0106172 | A1* | 4/2015 | Salama | G07B 15/02 |
| | | | | 705/13 |
| 2015/0166072 | A1* | 6/2015 | Powers | G08G 1/015 |
| | | | | 701/1 |
| 2016/0371974 | A1* | 12/2016 | Nordbruch | G08G 1/146 |
| 2017/0011631 | A1* | 1/2017 | Nordbruch | G08G 1/042 |
| 2017/0220787 | A1* | 8/2017 | Inokuchi | G06F 21/32 |
| 2018/0240337 | A1* | 8/2018 | Moran | G08G 1/147 |
| 2018/0266855 | A1* | 9/2018 | Sodan | G01D 11/245 |
| 2018/0374004 | A1* | 12/2018 | Eone | G08G 1/149 |
| 2019/0139409 | A1* | 5/2019 | Longardner | G08G 1/144 |

FOREIGN PATENT DOCUMENTS

| | | |
|---|---|---|
| DE | 102017221304 A1 | 5/2019 |
| WO | 2016/131625 A1 | 8/2016 |

\* cited by examiner

PARKING SENSOR DEVICE FOR DETERMINING OCCUPANCY OF A PARKING SPACE

RELATED APPLICATION

This patent application claims priority to U.S. Provisional Patent Application No. 62/706,728 filed on Sep. 4, 2020, the entire disclosure of which is incorporated by reference.

FIELD OF THE DISCLOSURE

This disclosure relates to parking sensor devices that determine occupancy of parking spaces.

BACKGROUND

A parking sensor device can be placed in a vicinity of a parking space (e.g. underneath the parking space) and used to determine occupancy the parking space. The parking sensor device can include a magnetometer sensor configured to detect a magnetic field. When a vehicle drives in/out of the parking space, there is a change in the magnetic field that can be detected by the magnetometer sensor and used by the parking sensor device to determine occupancy of the parking space. The parking sensor device can be battery-powered.

Unfortunately, conventional parking sensor devices, such as the parking sensor device described above, can be inaccurate. In particular, they can falsely report that a parking space is occupied when it is not actually occupied. Conversely, they can falsely report that a parking space is available when it is actually occupied. This is because readings from a magnetometer sensor can include a lot of noise due to electrical interference. They can also be difficult to interpret due to variations in sensor orientation and influence of nearby large metal objects including occupancy of nearby parking stalls. Moreover, the conventional parking sensor devices may not have very long battery life, and may be expensive as well.

Therefore, the conventional parking sensor devices leave much to be desired. It is desirable to improve upon the conventional parking sensor devices to address or mitigate some or all of the aforementioned shortcomings.

SUMMARY OF THE DISCLOSURE

Disclosed is a parking sensor device for determining occupancy of a parking space. The parking sensor device has a magnetometer sensor configured to detect a magnetic field, and a radar sensor configured to perform at least one radar scan to detect presence of an object. In accordance with an embodiment of the disclosure, the parking sensor device has control circuitry configured to determine occupancy of the parking space based on the magnetic field and the at least one radar scan. Utilizing this particular combination of sensor input can help to improve accuracy and reliability of determining occupancy of the parking space, especially when compared to existing approaches that utilize a single sensor such as a magnetometer sensor. The parking sensor device also has an output for conveying occupancy of the parking space.

In some implementations, the output of parking sensor device includes a wireless transmitter configured to transmit a wireless message indicating occupancy of the parking space. Note that there can be other parking sensor devices similarly reporting occupancy of other parking spaces. In some implementations, a server receives this reporting and keeps track of occupancy for several parking spaces. In some implementations, the server conveys the occupancy of the parking spaces to one or more client devices, for example through a web interface or through a mobile app. This can allow motorists to learn which parking spaces are available. It can also facilitate data gathering of parking space occupancy over time, which could later be used to assist a manager in making various business-related decisions concerning the parking spaces.

In some implementations, the parking sensor device has a battery configured to supply power to the magnetometer sensor, the radar sensor, the control circuitry, and the wireless transmitter (if present). In some implementations, the parking sensor device operates with reduced power consumption whenever practical to prolong battery life. For example, the control circuitry could operate in a low power state most of the time. In some implementations, the control circuitry transitions from the low power state to an operating state upon the magnetometer sensor detecting a change in the magnetic field, such that the control circuitry can determine occupancy of the parking space, and transition back to the low power state after triggering the wireless transmitter to transmit the wireless message. In this way, it may be possible to prolong battery life by up to ten years or more, for example.

In another embodiment of the disclosure, rather than the control circuitry of the parking sensor device determining occupancy of the parking space, the control circuitry obtains readings from the magnetometer sensor and the radar sensor, and the output conveys the readings. In this way, the parking sensor device can function as a conduit for the readings from the magnetometer sensor and the radar sensor, and the server instead determines occupancy of the parking space based on the readings. The server can still convey occupancy of parking spaces to one or more client devices, for example through a web interface or through a mobile app. In some implementations, the server also conveys a determined occupancy to a parking device so that the parking device can learn or improve on parking status determinations.

Other aspects and features of the present disclosure will become apparent, to those ordinarily skilled in the art, upon review of the following description of the various embodiments of the disclosure.

BRIEF DESCRIPTION OF THE DRAWINGS

Embodiments will now be described with reference to the attached drawings in which.

DETAILED DESCRIPTION OF EMBODIMENTS

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Introduction

Figure 1:
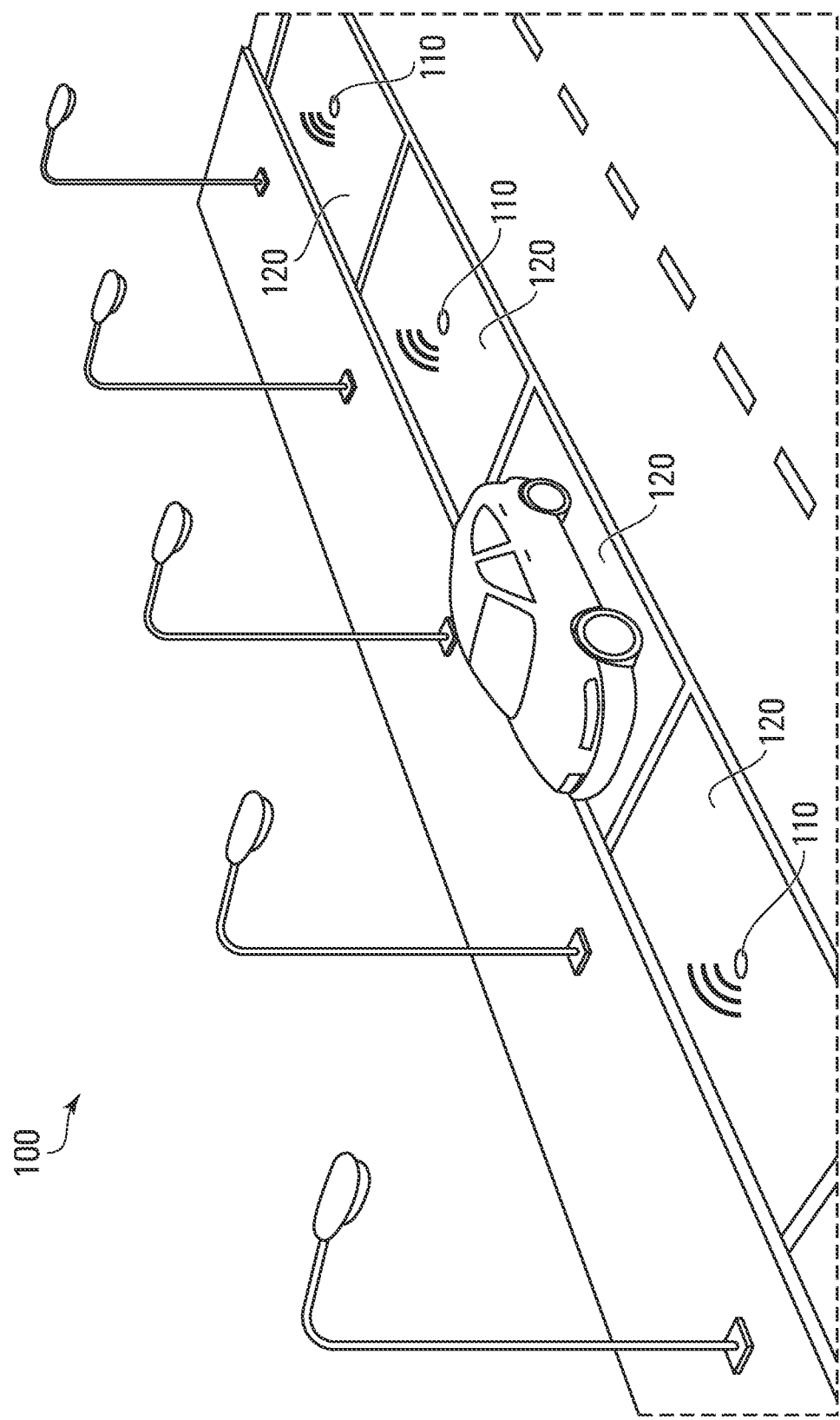
FIG. 1 is a schematic of an example parking environment having parking sensor devices for parking spaces.

Referring first to FIG. 1, shown is a schematic of an example parking environment 100 having parking sensor devices 110 for parking spaces 120. The parking environment 100 includes a road with multiple parking spaces 120. However, it is to be understood that other parking environments are possible, such as parking lots and/or parking garages, for example. Each parking space 120 has a parking sensor device 100, which is configured to determine occupancy of the parking space 120 (i.e. occupied by a vehicle or empty). In some implementations, the occupancy of each parking space 120 is conveyed to motorists to assist them to find a parking space 120 that is empty.

In the illustrated example, each parking sensor device 100 is placed underneath a parking space 120 and is used to determine occupancy of the parking space 120. Each parking sensor device 100 can be mounted on a surface of the parking space 120, or embedded within the parking space 120 (e.g. embedded in concrete or asphalt). Alternatively, each parking sensor device 100 can be deployed in other positions in vicinity of a parking space, such above or beside the parking space.

Figure 2:
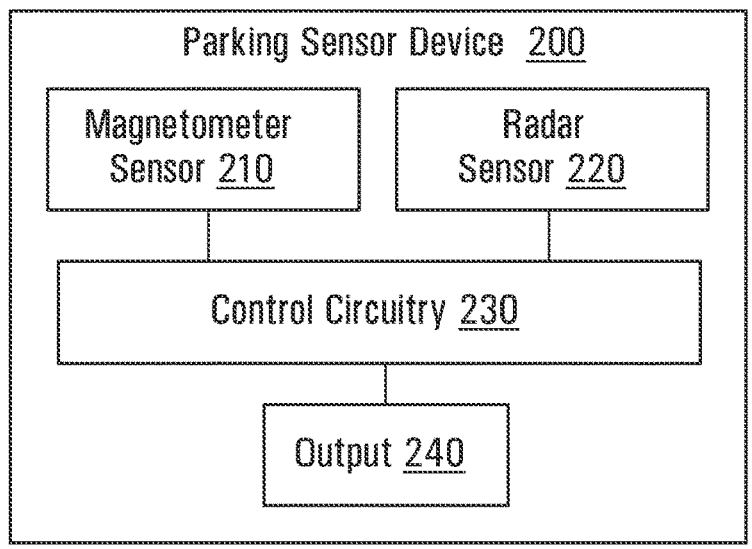
FIG. 2 is a block diagram of an example parking sensor device.

Referring now to FIG. 2, shown is a block diagram of an example parking sensor device 200. The parking sensor device 200 has a magnetometer sensor 210, a radar sensor 220, control circuitry 230, an output 240, and may have other components that are not specifically shown. Several of the parking sensor devices 200 can be deployed in a parking environment, for example the parking environment 100 of FIG. 1. However, it is possible to instead deploy a single parking sensor device 200 in a parking environment.

Figure 3:
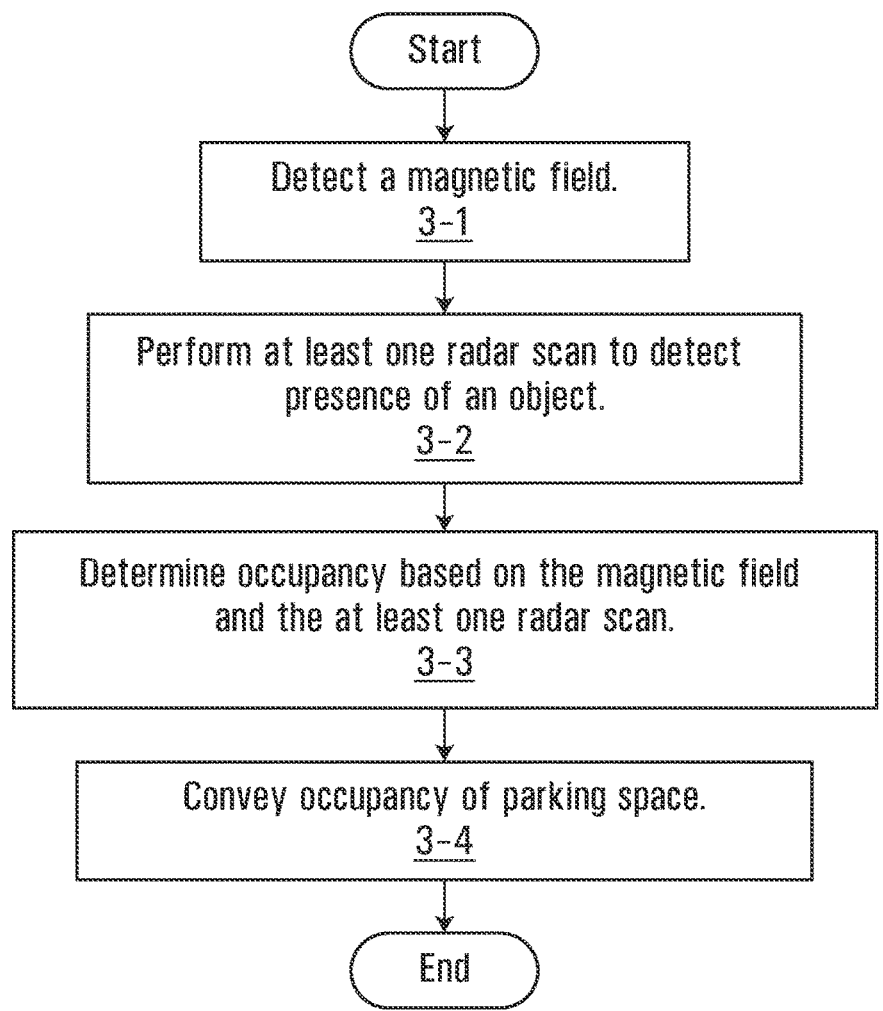
FIG. 3 is a flowchart of an example method for determining occupancy of a parking space.

Operation of the parking sensor device 200 will be described below with reference to FIG. 3, which is a flowchart of an example method for determining occupancy of a parking space. Although the method of FIG. 3 is described below with reference to the parking sensor device 200 of FIG. 2, it is to be understood that the method of FIG. 3 is applicable to other parking sensor devices. In general, the method of FIG. 3 is applicable to any appropriately configured parking sensor device.

At step 3-1, the magnetometer sensor 210 of the parking sensor device 200 detects a magnetic field. At step 3-2, the radar sensor 220 of the parking sensor device 200 performs at least one radar scan to detect presence of an object. In some implementations, step 3-2 is triggered upon detecting a change in the magnetic field which could be caused by a vehicle entering or leaving the parking space.

In accordance with an embodiment of the disclosure, at step 3-3 the control circuitry 230 of the parking sensor device 200 determines occupancy of the parking space (i.e. occupied by a vehicle or empty) based on the magnetic field and the at least one radar scan. Utilizing this particular combination of sensor input can help to improve accuracy and reliability of determining occupancy of the parking space, especially when compared to existing approaches that utilize a single sensor such as a magnetometer sensor. Finally, at step 3-4, the output 240 of the parking sensor device 200 conveys occupancy of the parking space. This information could be relayed to motorists to assist them to find a parking space 120 that is empty.

There are many possibilities for the magnetometer sensor 210 of the parking sensor device 200. In some implementations, the magnetometer sensor 210 is a programmable magnetometer. A programmable magnetometer can be programed to improve its ability to detect an object such as a vehicle. For example, the programmable magnetometer can be programed to increase or decrease its sensitivity to a magnetic field or to a change thereof. In other implementations, the magnetometer sensor 210 is not programmable. Other implementations are possible and are within the scope of the disclosure.

There are many possibilities for the radar sensor 220 of the parking sensor device 200. In some implementations, the radar sensor 220 is a 60 Ghz radar system with a transmitter and receiver. However, it is to be understood that other suitable radar frequencies are possible. Other implementations are possible and are within the scope of the disclosure.

There are many possibilities for the control circuitry 230 of the parking sensor device 200. In some implementations, the control circuitry 230 includes a microcontroller or other processor. In other implementations, the control circuitry 230 includes an FPGA (Field-Programmable Gate Array) or an ASIC (Application-Specific Integrated Circuit). Other implementations are possible and are within the scope of the disclosure.

According to another embodiment of the disclosure, there is provided a non-transitory computer readable medium having recorded thereon statements and instructions that, when executed by a processor (e.g. microcontroller) of a parking sensor device, implement a method as described herein. There are many possibilities for the non-transitory computer readable medium. In some implementations, the non-transitory computer readable medium is a flash memory. Other possibilities include an SSD (Solid State Drive), a hard disk drive, a CD (Compact Disc), a DVD (Digital Video Disc), a BD (Blu-ray Disc), a memory stick, or any appropriate combination thereof.

There are many possibilities for the output 240 of the parking sensor device 200. In some implementations, the output 240 of the parking sensor device 200 includes a wireless transmitter configured to transmit a wireless message indicating occupancy of the parking space. This can enable occupancy of the parking space to be conveyed to one or more motorists through a wireless communication system. An example of this will be described below with reference to FIG. 4. In other implementations, the output 240 of the parking sensor device 200 includes a wired connection, for example to a sign or billboard to convey occupancy of the parking space to anybody viewing the sign or billboard. Note that sending information to a sign or billboard can be done wirelessly. Both wired and wireless connections can be used, for example to communicate with a server and/or with a sign or billboard. Other implementations are possible and are within the scope of the disclosure.

In some implementations, the parking sensor device 200 has a battery (not shown) configured to supply power to the magnetometer sensor 210, the radar sensor 220, the control circuitry 230, and the wireless transmitter. In some implementations, the parking sensor device 200 operates with reduced power consumption whenever practical to prolong battery life. The control circuitry 230 can operate in a low power state most of the time. In some implementations, the control circuitry 230 transitions from the low power state to an operating state upon the magnetometer sensor 210 detecting a change in the magnetic field, such that the control circuitry 230 can determine occupancy of the parking space, and then transition back to the low power state after triggering the wireless transmitter to transmit the wireless message. In this way, it may be possible to prolong battery life by up to ten years or more, for example. In other implementations, the parking sensor device 200 receives power through an external power source in which case the parking sensor device 200 may not have a battery.

The parking sensor device 200 uses multiple sensors, including the magnetometer sensor 210 and the radar sensor 220, to increase accuracy and reliability of determining occupancy of a parking space, as described above. At the same time, the parking sensor device 200 can achieve a long battery life, for example up to ten years or more. In addition, the parking sensor device 200 may cost only about $50 USD per unit to manufacture. The parking sensor device 200 can be used above ground or in ground.

Example Wireless Communication System

Figure 4:
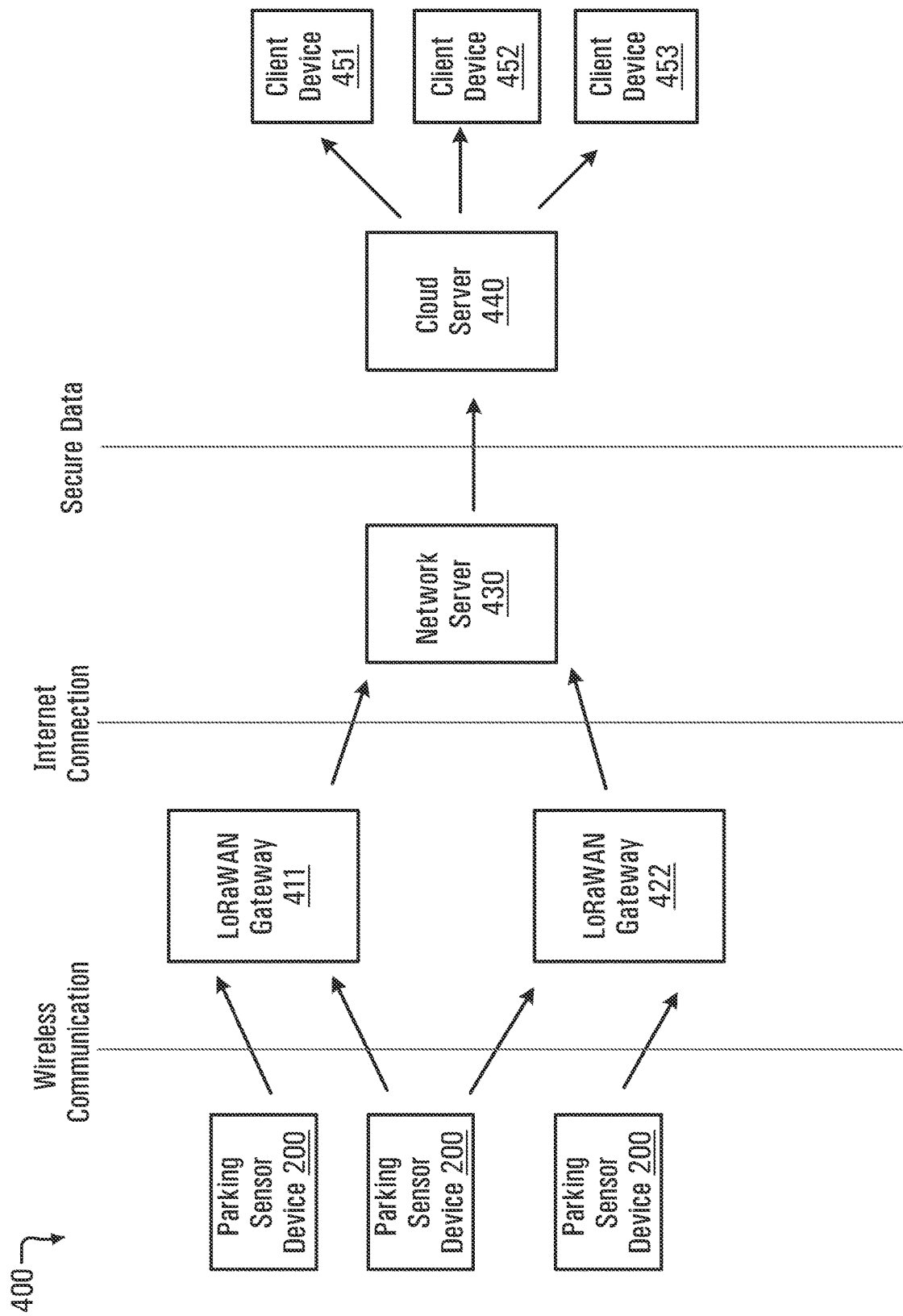
FIG. 4 is a block diagram of an example wireless communication system for conveying occupancy of parking spaces.

Referring now to FIG. 4, shown is a block diagram of an example wireless communication system 400 for conveying occupancy of parking spaces. It is to be understood that the wireless communication system 400 is very specific and is provided merely as an example. The wireless communication system 400 has several parking sensor devices 200, which each wirelessly report occupancy of a parking space to a LoRaWAN gateway 411 and 422. LoRaWAN is a wireless technology that enables low power but limited bandwidth transmission. There can be more than one LoRaWAN gateway 411 and 422, depending how disperse the parking spaces are and depending on coverage area. The one or more LoRaWAN gateways 411 and 422 report occupancy of the parking spaces to a network server 430, which in turn conveys the occupancy of the parking spaces to a cloud server 440, which in turn conveys the occupancy of the parking spaces to one or more client devices 451-453, for example through a web interface.

The wireless communication system 400 can allow motorists to learn which parking spaces are available. It is common for motorists to have client devices 451-453 such as smartphones for example, and such client devices can be used to learn which parking spaces are available. As noted above, the client devices 451-453 can connect to the cloud server 440 through a web interface. Such access can be made possible through a standard web browser. Alternatively, the client devices 451-453 can connect to the cloud server 440 using a mobile app.

It is noted that the wireless communication system 400 can also serve as an analytics platform. In particular, the wireless communication system 400 can facilitate data gathering of parking space occupancy over time, which could later be used to assist a manager in making various business-related decisions concerning the parking spaces. Other possible uses include (1) updating parking signs such as space availability or wayfinding, (2) providing space availability data to other systems such as enforcement or payment systems, and/or (3) sending information directly to vehicle wireless systems like DSRC (dedicated short-range communications). Other uses for the wireless communication system 400 may be possible.

In the illustrated example, each parking sensor device 200 collects sensor data from all of its internal sensors, including the magnetometer sensor 210 and the radar sensor 220. Each parking sensor device 200 makes a determination of occupancy for a parking space based on the sensor data. As noted above, the wireless message transmitted by the parking sensor device 200 indicates occupancy of the parking space as calculated by the parking sensor device 200. In some implementations, the wireless message also includes the sensor data. In some implementations, given a limited bandwidth of LoRaWAN, the sensor data is converted to a reduced representation before transmission. In some implementations, the indication of occupancy, the reduced representation of the sensor data, and indications of temperature and battery status are sent via a LoRaWAN radio to the network server 430 of the local network, which in turn relays that data to the cloud server 440.

In some implementations, the cloud server 440 stores all the data and then provides analytics on that data. In some implementations, the cloud server 440 performs analytics and makes a determination of the parking status based on the reduce representation of the sensor data. In some implementations, the cloud server 440 is configured to employ machine learning to enable advance decisions on parking status. In some implementations, the cloud server 440 provides feedback to the parking sensor device 200 so that the parking sensor device 200 may improve accuracy in determining occupancy. For example, the parking sensor device 200 can maintain a configuration of how occupancy is determined, and if the determination of the parking status by the cloud server 440 differs from the indication of occupancy by the parking sensor device 200, then the cloud server 440 provides feedback to the parking sensor device 200 to adjust the configuration. In some implementations, the cloud server 440 performs analytics on the parking state data to produce statistics on parking usage as well as real-time status. In some implementations, the cloud server 440 is based on a commercial cloud service such AWS™ (Amazon Web Services) or Microsoft Azure™. Other implementations are possible.

Another Example Parking Sensor Device

Figure 5:
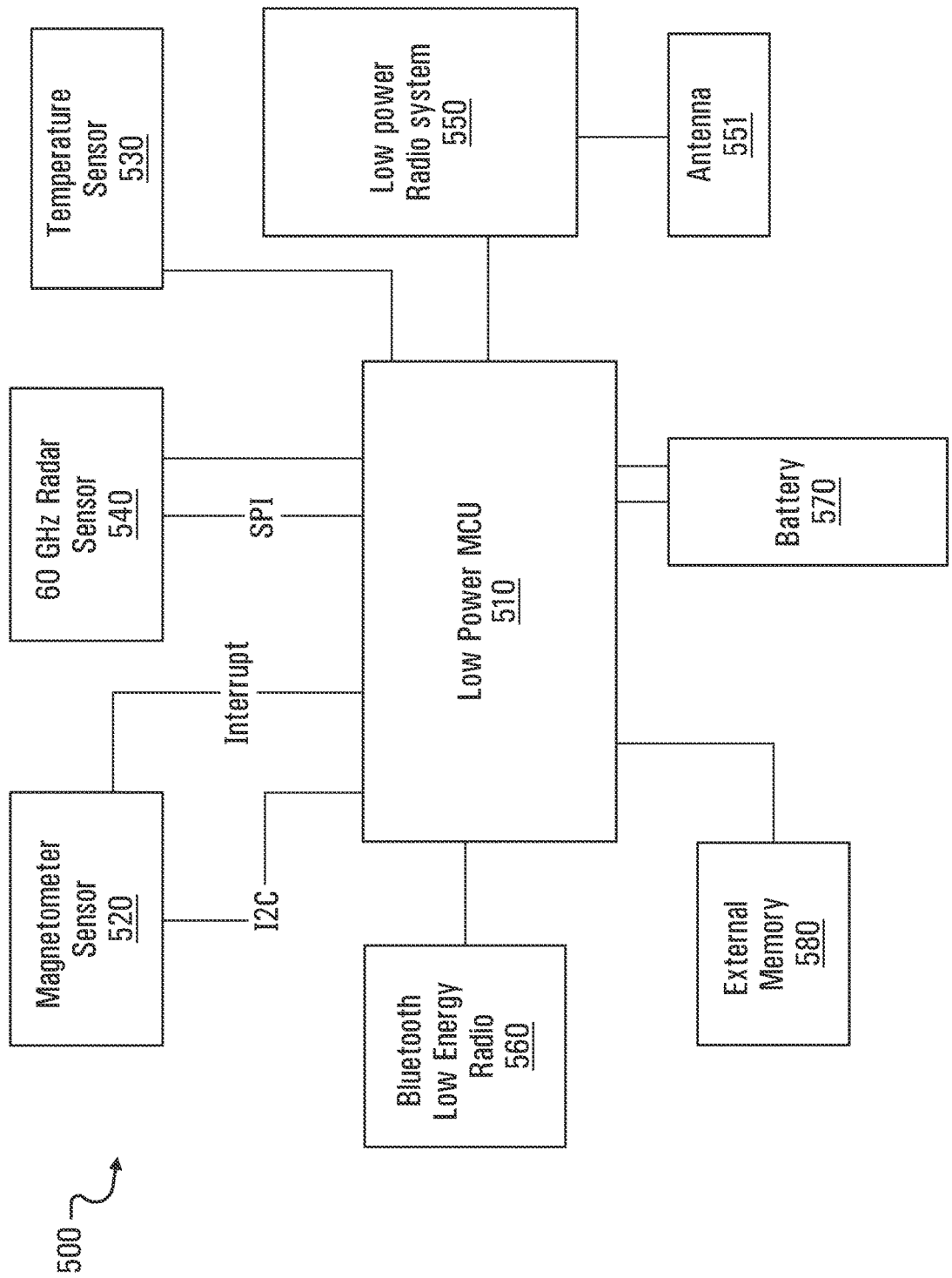
FIG. 5 is a block diagram of another example parking sensor device.

Referring now to FIG. 5, shown is a block diagram of another example parking sensor device 500. It is to be understood that the parking sensor device 500 is very specific and is provided merely as an example. The parking sensor device 500 has a low-power MCU (microcontroller unit) 510, a magnetometer sensor 520, a temperature sensor 530, a 60 Ghz radar sensor 540, a low-power long-range radio 550 with antenna 551, a BLE (Bluetooth Low Energy) radio 560, a battery 570, external memory 580, and may have other components that are not specifically shown. A brief discussion of the components of the parking sensor device 500 is provided below.

In some implementations, the low power MCU 510 can enter low power states because the parking sensor device 500 should spend the majority of its life in this state to save power consumption from the battery 570. The standby power can be in low microampere range. It can have low or minimal RAM (random access memory) and external memory 580 to save power.

In some implementations, the magnetometer sensor 520 is programmable and can run in a low power detection mode so that when a magnetic event that meets the programmed criteria, it can interrupt and wake up the MCU 510. The magnetometer sensor 520 can measure magnetic events in 3D space and produce readings in three planes. The magnetometer sensor 520 operates in a low power mode and detects a change in magnetic field when a car arrives or leaves, which triggers a 60 GHz radar measurement to check for a vehicle.

In some implementations, the 60 Ghz radar sensor 540 includes an integrated transmitter and receiver. The transmitter generates short pulses of 60 GHz RF signals, and the receiver listens for reflections of the signals off objects. The 60 Ghz radar sensor 540 produces a stream of data representing a range of distances and an amplitude of any reflected return signals at those distances.

It has been observed that the 60 Ghz radar sensor 540 can get blocked by a blocking substance near the parking sensor device 500. The blocking substance can for example include water on top of the parking sensor device 500. Therefore, in some implementations, the parking sensor device 500 is configured to detect a blocking substance (e.g. water) on top of the parking sensor device 500. The 60 Ghz radar sensor 540 experiences direct leakage from transmit to receive antennas which look like a large reflection close to the parking sensor device 500. In some implementations, to help distinguish a blocking substance from this direct leakage, the parking sensor device 500 has a structure (not shown) positioned relative to the radar sensor 540 so that radar scans traverse the structure and are slowed down. The structure has a dielectric constant that slows down the at least one radar scan. This can improve detection of nearby objects, including water or another blocking substance on top of the parking sensor device 500, by separating the reflection off the blocking substance from the radar sensor's internal direct leakage. In some implementations, the structure has a shape of a cone or a frustum.

In some implementations, the parking sensor device 500 makes use of a "close scan" mode for water detection. In some implementations, the parking sensor device 500 chooses between three types of radar scans:
  low clearance car scan,
  high clearance car scan, and
  water detection scan.
When the radar waves are unobstructed, radar results can be used to train the magnetometer sensor 520 so that magnetometer algorithms can learn to be more accurate than just using the magnetometer sensor 520. This can be done for both empty and occupied states.

In some implementations, the low-power long-range radio 550 has good propagation characteristics to allow the sensor data to be transmitted from in the ground or in concrete parking structures to a wireless network. LoRaWAN is an example of such wireless technology that could be used. A trade off is low bit rates and restrictions on an amount of data that can be sent. It is possible that the low power radio 550 is integrated into the MCU 510. Low-power long-range radios are good at transmitting sensor data, but can have limited capability when it comes to contacting the sensor.

In some implementations, the BLE radio 560 is used to control and configure the parking sensor device 500. Parking sensor devices 500 can leave a factory in a "shelf mode" to preserve battery. A proprietary mobile app can activate the parking sensor devices 500 as well as commission them for service. It is possible that the BLE radio 560 is integrated into the low power MCU 510. BLE provides a very low power but limited range signal. The power they use is a faction of that used by the long range radio 550 and thus are good for allowing asynchronous contact with the parking sensor devices 500, for example when a human wants to interact with the parking sensor device 500. BLE also has bandwidth for extracting real-time data from the parking sensor device 500 or sending firmware updates to the parking sensor device 500.

In some implementations, the BLE radio 560 is used to connect to a client device via a mobile app. The mobile app can ease installation by allowing the user to connect to the parking sensor device 500, map its install location, and configure the parking sensor device 500. The mobile app can connect to a cloud application to download maps and upload sensor locations. In some implementations, the BLE radio 560 is used to enable adjacent or nearby parking sensor devices 500 to talk to each other and help improve the detection algorithm. For example, adjacent parking sensor devices 500 can talk to each other using BLE to communicate detected magnetic field information and/or radar scan information. This could help a parking sensor device 500 to know when a large object (e.g. big truck) is detected that may affect magnetic field of adjacent spaces, for example.

In some implementations, the BLE radio 560 is used to talk to tags to implement parking pass and reservations systems. For example, the parking sensor device 500 may use BLE to communicate with another user's BLE-enabled Tag/device. The parking sensor device 500 can then validate to ensure the correct user is at the parking spot. This can be done by checking the user's BLE-enabled tag/device ID. If the parking sensor device 500 cannot communicate with user's Tag/device, or the device ID is invalid, an alert can be triggered on the server to the appropriate authority for any action to be taken against the vehicle. The BLE tag system can also be used for billing and data collection purposes, determining the duration a certain user is in the parking spot for billing, and determining the number of different users on the parking spot to provide analytics on optimizing parking reservation systems.

In some implementations, the temperature sensor 530 reports the ambient temperature of the parking sensor device 500 to the MCU 510 when requested. In some implementations, the parking sensor device 500 compensates readings from the magnetometer sensor 520 and/or the radar sensor 540 based on temperature. This is because performance may shift with temperature. The temperature data can be sent to the cloud but also used by the parking sensor device 500 to compensate data for temperature-sensitive components such as the radar sensor 540. Temperature can also help to manage the battery life.

In some implementations, the battery 570 has a chemistry that provide very low leakage such that it can provide consistent current for up to 10 years or more.

Example Method for Determining Occupancy

Figure 6A:
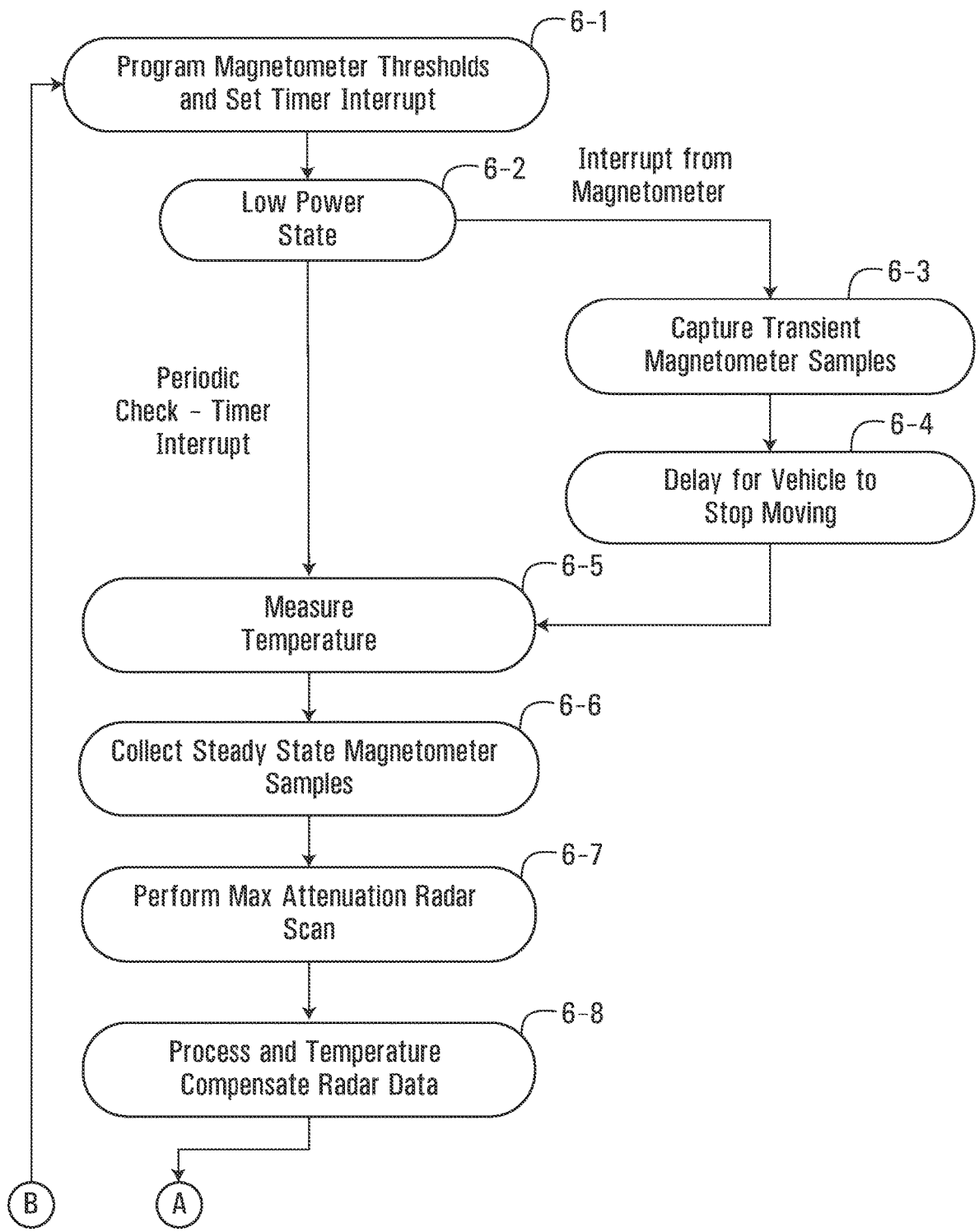
FIGS. 6A to 6B are flowcharts of another example method for determining occupancy of a parking space.
Figure 6B:
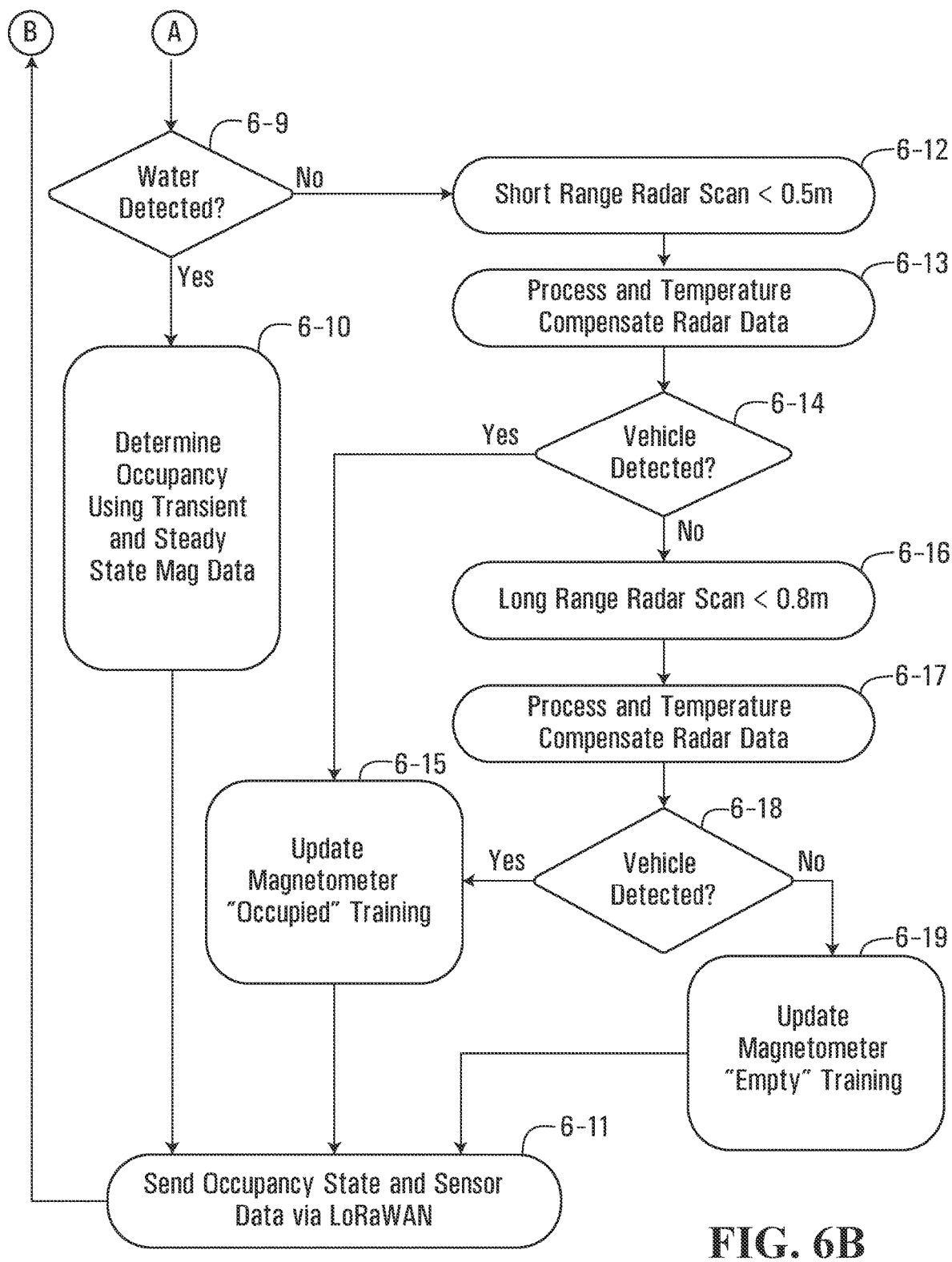

Referring now to FIGS. 6A and 6B, shown are flowcharts of another example method for determining occupancy of a parking space. This method can be executed by control circuitry of a parking sensor device, for example by the low power MCU 510 of the parking sensor device 500 shown in FIG. 5, or by the control circuitry 230 of the parking sensor device 200 shown in FIG. 2. It is to be understood that the method is very specific and is provided merely as an example.

At step 6-1, the control circuitry programs magnetometer thresholds and sets a timer interrupt. The magnetometer thresholds are settings for triggering an interrupt from the magnetometer based on detecting a change of magnetic field, thereby triggering a radar scan as described below. The timer interrupt is utilized to periodically trigger a radar scan even if there is no interrupt from the magnetometer. At step 6-2, the control circuitry enters a low power state. It is possible that a majority of time is spent in the low power state to reduce power consumption.

Upon receiving an interrupt from the magnetometer, the control circuitry exits the low power state and captures transient magnetometer samples at step 6-3. The transient magnetometer samples are captured because there may be movement of a vehicle causing measurable changes in magnetic field. There can be a delay at step 6-4 while waiting for a vehicle (if any) to stop moving in or out of the parking space.

After capturing the transient magnetometer samples, or after the timer interrupt, the control circuitry proceeds to steps 6-5 to 6-9 to determine whether water is on the parking space. At step 6-5, the control circuitry obtains a temperature reading from a temperature sensor. At step 6-6, the control circuitry collects steady-state magnetometer samples. At step 6-7, the control circuitry performs a max attenuation radar scan using a radar sensor to obtain radar data. At step 6-8, the control circuitry processes and temperature compensates the radar data using the temperature reading obtained from the temperature sensor. At step 6-9, the control circuitry determines whether water is on the parking space based on the radar data that has been processed and temperature compensated.

If at step 6-9 the control circuitry detects water, then at step 6-10 the control circuitry determines occupancy of the parking space using the transient and/or steady-state magnetometer data. Finally, at step 6-11, the control circuitry conveys the occupancy, for example by transmitting a message containing an occupancy state to the LoRaWAN gateway. Optionally, the message can also include sensor data such as the transient and/or steady-state magnetometer data, the radar data, and the temperature reading.

However, if at step 6-9 the control circuitry does not detect water, then the control circuitry proceeds to steps 6-12 to 6-20 to determine occupancy of the parking space based on one or more additional radar scans. At step 6-12, the control circuitry performs a short-range radar scan (e.g. <0.5 m) using the radar sensor to obtain radar data. At step 6-13, the control circuitry processes and temperature compensates the radar data using the temperature reading obtained from the temperature sensor. At step 6-14, the control circuitry determines whether a vehicle is in the parking space based on the radar data that has been processed and temperature compensated.

If at step 6-14 the control circuitry detects a vehicle is in the parking space, then at step 6-15 the control circuitry updates magnetometer "occupied" training. In this way, the control circuitry leverages the radar data to train the magnetometer to better detect presence of a vehicle. Finally, at step 6-11, the control circuitry conveys the occupancy as already described above.

However, if at step 6-14 the control circuitry does not detect a vehicle in the parking space, then the control circuitry proceeds to steps 6-16 to 6-19 to determine occupancy of the parking space based on a third radar scan. At step 6-16, the control circuitry performs a long-range radar scan (e.g. <0.8 m) using the radar sensor to obtain radar data. At step 6-17, the control circuitry processes and temperature compensates the radar data using the temperature reading obtained from the temperature sensor. Then, at step 6-18, the control circuitry determines whether a vehicle is in the parking space based on the radar data that has been processed and temperature compensated.

If at step 6-18 the control circuitry detects a vehicle is in the parking space, then at step 6-15 the control circuitry updates magnetometer "occupied" training. However, if at step 6-18 the control circuitry does not detect a vehicle in the parking space, then at step 6-19 the control circuitry updates magnetometer "empty" training. Either way, the control circuitry leverages the radar data to train the magnetometer to better detect presence or absence of a vehicle. Finally, at step 6-11, the control circuitry conveys the occupancy as already described above.

According to the method described above, the control circuitry is configured to trigger at least one radar scan upon a change in magnetic field being detected. In addition, the control circuitry is configured to periodically trigger the at least one radar scan. Also, the parking sensor device has a temperature sensor configured to detect a temperature, and the control circuitry is configured to assess each radar scan as a function of the temperature.

According to the method described above, the control circuitry is configured to determine occupancy of the parking space by determining whether the object detected by the at least one radar scan includes a blocking substance (e.g. water) near the parking sensor device. When the object detected by the at least one radar scan includes a blocking substance near the parking sensor device, the control circuitry determines occupancy of the parking space based on the magnetic field. However, when the object detected by the at least one radar scan does not include a blocking substance near the parking sensor device, the control circuitry determines occupancy of the parking space based on the at least one radar scan.

According to the method described above, at least one radar scan includes an initial radar scan to detect presence of a blocking substance near the parking sensor device, and at least one subsequent radar scan to detect presence of a vehicle. The control circuitry triggers the least one subsequent radar scan if the initial radar scan does not detect presence of a blocking substance near the parking sensor device. At least one subsequent radar scan includes a first subsequent radar scan and a second subsequent radar scan having a longer range than the first subsequent radar scan, and the control circuitry triggers the second subsequent radar scan if the first subsequent radar scan does not detect presence of a vehicle.

According to the method described above, the control circuitry is configured to adjust settings of the magnetometer sensor based on a result of the at least one subsequent radar scan.

Example Industrial Design

Figure 7A:
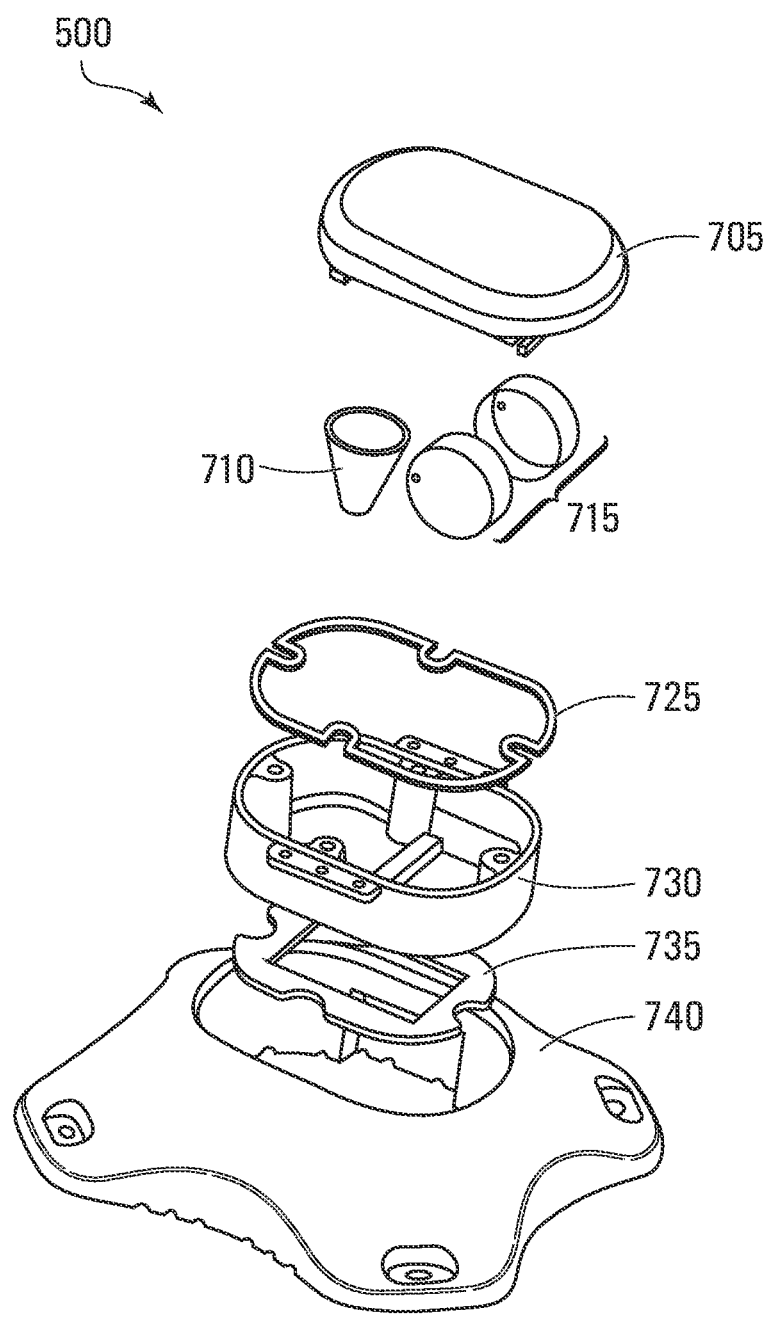
FIGS. 7A and 7B are schematics showing exploded views of an example parking sensor device.
Figure 7B:
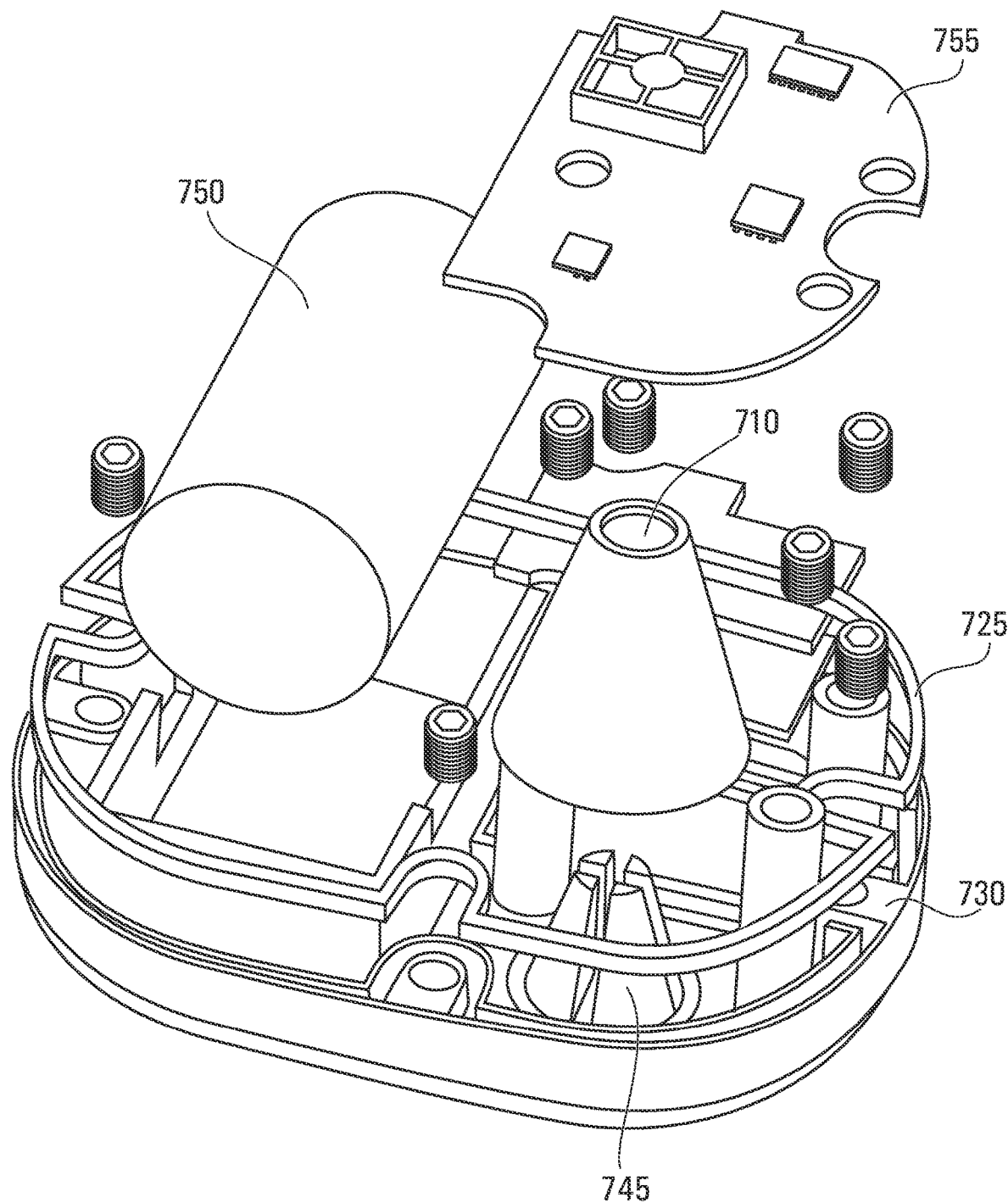

Referring now to FIGS. 7A and 7B, shown are schematics of exploded views of an example parking sensor device 700. It is to be understood that the parking sensor device 700 is very specific and is provided merely as an example. FIG. 7A shows a top housing 705, a bottom cone 710, a battery end cap 715, an IP housing gasket 725, a bottom housing 730, a bottom damping gasket 735, and an outer enclosure ramp 740. FIG. 7B shows an upside down view of the top housing 705, which includes a top cone 745 in the form of four tines or pillars that couple with the bottom cone 710. In addition, FIG. 7B shows a battery 750, a PCB (printed circuit board) 755, and the IP housing gasket 725. Some components are shown in FIG. 7B but not in FIG. 7A, and vice-versa.

In some implementations, the parking sensor device 700 has an industrial design with some or all of the following features:

the parking sensor device 700 can be a common core sensor for both surface mount and in ground uses, the parking sensor device 700 can be environmentally sealed from external elements, the parking sensor device 700 can be able to withstand weight of large vehicles without damaging the PCB 755 and other internal components, the housing 705 and 730 can structurally integrate the cone 710 and 745, the cone 710 and 745 can be made of the same material as the housing 705 and 730 and the outer enclosure ramp 740, the cone 710 and 745 can sit 0.5 mm above the PCB 755, and the battery 750 can be a D-cell battery.

The cone 710 and 745 is used to slow down the radar pulses and to make a surface of the parking sensor device 700 measure as further away. This is used to allow the parking sensor device 700 to differentiate the reflections due to water or other material blocking the radar signal from direct TX to RX leakage internal to the radar sensor. The cone 710 and 745 is manufactured in a very consistent manner such that the performance and dielectric constant do not vary. In some implementations, a polycarbonate is used for the housing 705 and 730 and the outer enclosure ramp 740 and thus the cone 710 and 745 is also made of the same polycarbonate to avoid electromagnetic waves from passing through multiple materials and causing additional reflections.

The cone 710 and 745 is too thick to manufacture one piece of polycarbonate consistently, so a two-piece design is used. The two pieces 710 and 745 are joined precisely to avoid air gaps inside the cone. A preferred design has one piece 745 of the cone as part of the top house 705 and has four tines. A second piece 710 forms an outer cone and accepts the four tines to become almost solid. The outside of the cone 710 and 745 is wrapped in copper tape to ensure all the radar signals are reflected up through the cone 710 and 745. The result is a 3 cm cone structure that adds approximately another 3 cm to any measurement taken by the radar sensor. For example, an object directly on top of the parking sensor device 700 will measure as 6 cm away when the object is only 3 cm from the parking sensor device 700.

Example Radar & Magnetometer Data

Referring now to FIGS. 8A to 8D, shown are graphs of example radar captures. Data from the radar sensor is a representation of a reflected signal and includes two parts: reflected power and time of flight. The time of flight can be converted to a distance measurement. The graphs of FIGS. 8A to 8D represent a strength of the reflected power vs the distance to a reflecting object.

Figure 8B:
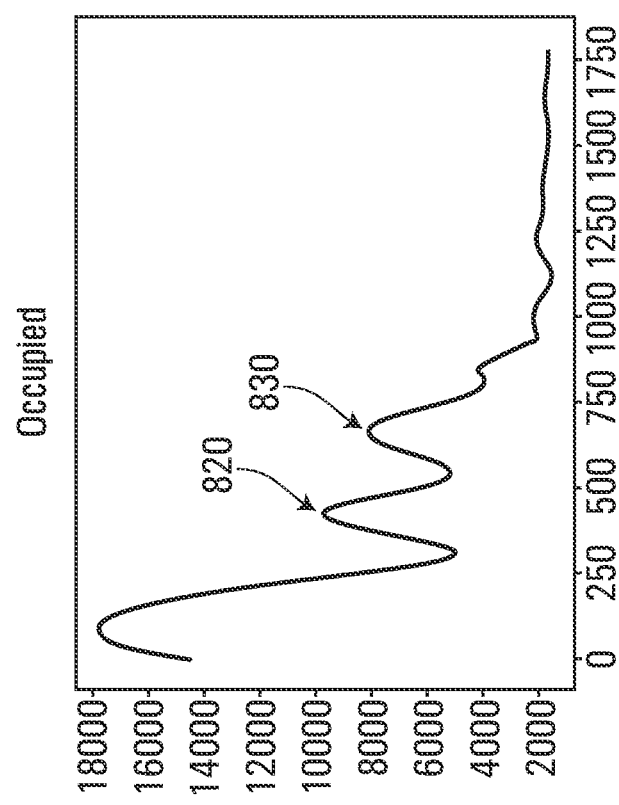
FIGS. 8A to 8D are graphs of example radar captures.
Figure 8A:
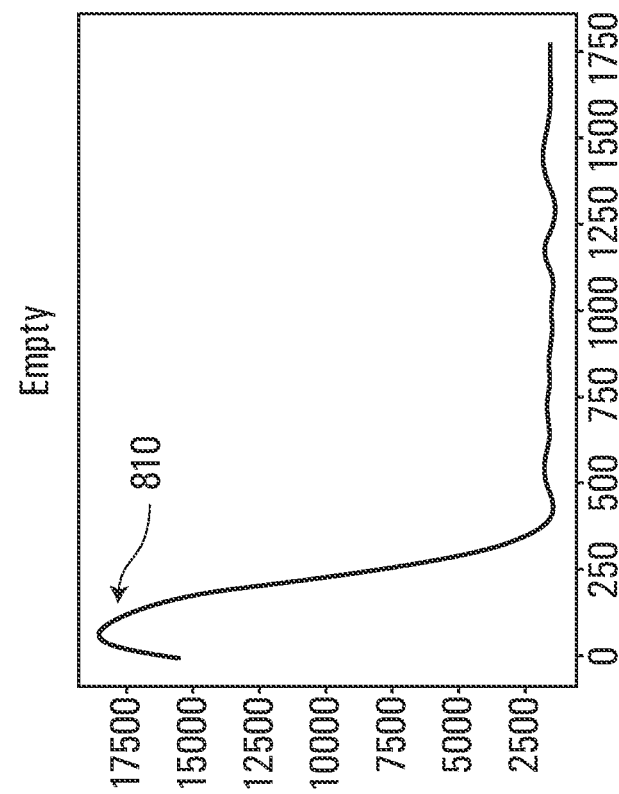

FIG. 8A shows a graph of example radar captures for an empty parking space. The graph shows an internal reflection 810 that does not suggest presence of a vehicle. The internal reflection 810 is due to direct leakage from transmit to receive antennas within the radar sensor device.

FIG. 8B shows a graph of example radar captures for a parking space having a Ford F150™ in the parking space. Large amplitudes 820 and 830 suggest a solid object such as vehicle. The large amplitudes 820 and 830 include a second amplitude 830 indicating either a secondary reflection or a reflection off a second surface of the vehicle, which confirms a surface is present.

Figure 8C:
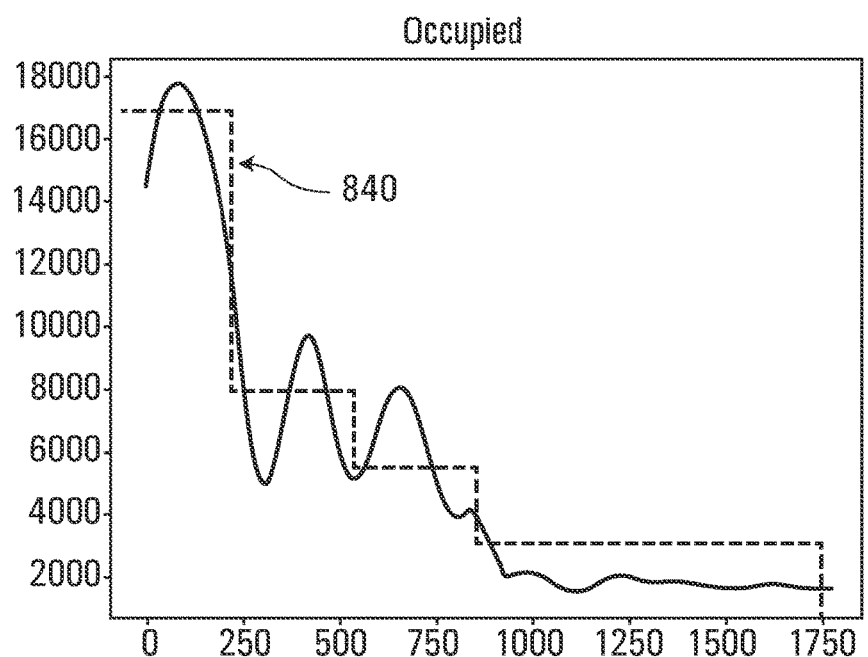

FIG. 8C shows the same graph of FIG. 8B, but with addition of a set of "stair" thresholds 840. In some implementations, the presence of a vehicle is determined using such thresholds 840. The thresholds 840 are set such that a peak above the thresholds 840 likely indicates presence of a vehicle, and a peak below the thresholds 840 can be a result of noise or transient signal. The thresholds 840 are used because as the distance to the object increases so does attenuation of the signal.

Figure 8D:
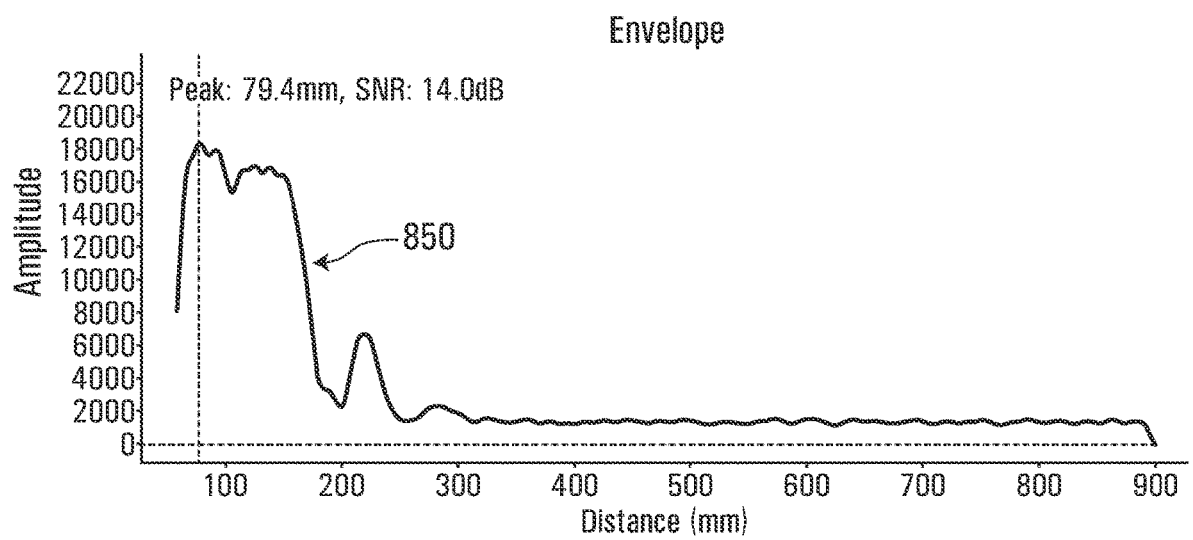

FIG. 8D shows a reflected signal when water is on top of the parking sensor device with no vehicle being present. When something such as water is on top of the parking sensor device, then the reflected signal 850 will be strong and measure very close. There may also be many secondary reflections as the electromagnetic pulse bounces between the water and the radar creating a wide pulse that is actual bunch of peaks close together.

Referring now to FIGS. 9A to 9D, shown are graphs of example magnetometer captures. The magnetometer data shows a shift in magnet field from all three vectors (i.e. x-axis, y-axis, and z-axis) under four different scenarios. Each scenario involves two parking spaces as depicted, and all measurements are made from the parking space on the right side.

Figures 9A, 9B:
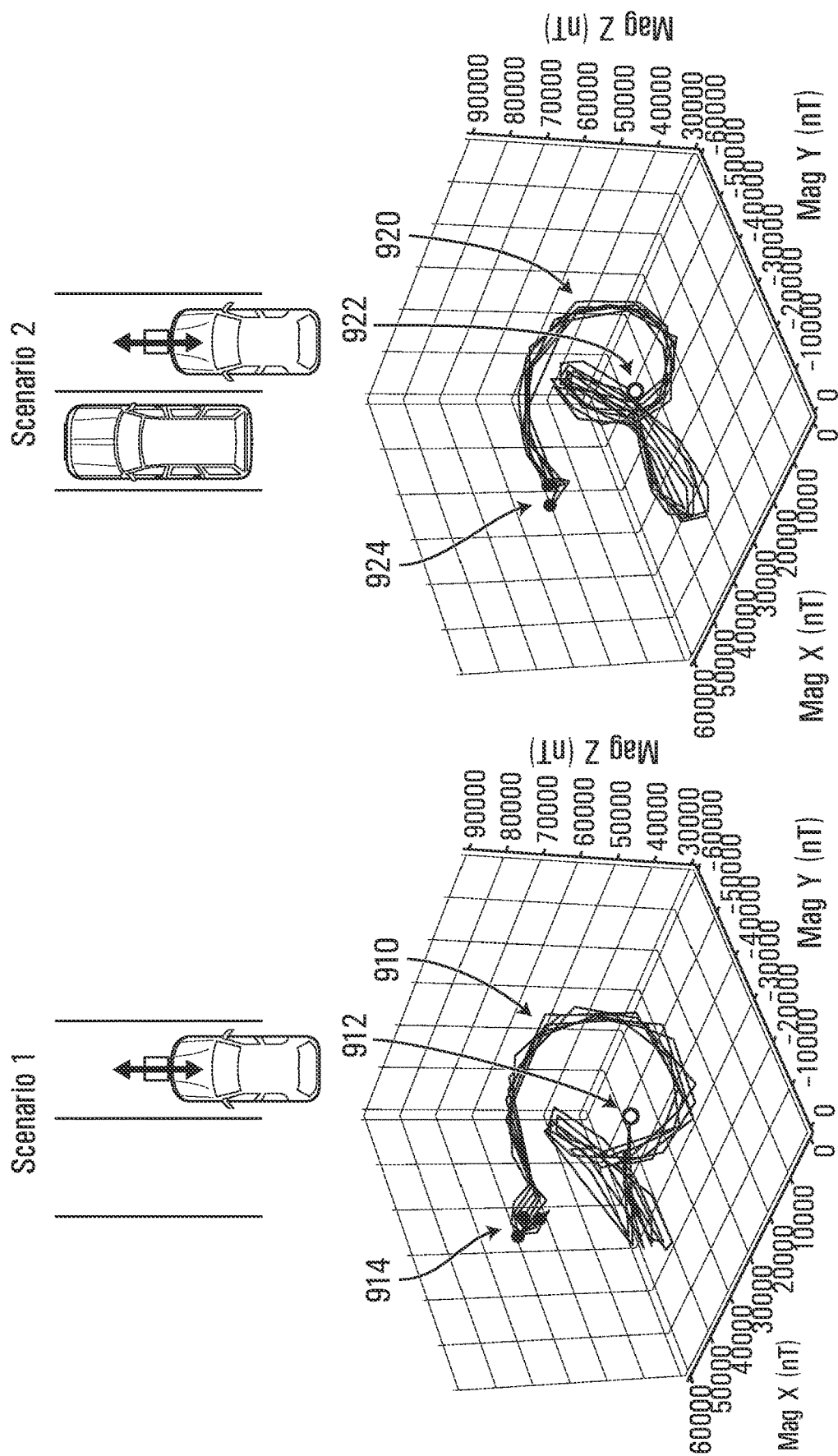
FIGS. 9A to 9D are graphs of example magnetometer captures.

FIG. 9A shows magnetometer data 910 under a first scenario in which a vehicle enters or leaves a parking space with a vacant adjacent spot. The magnetometer data 910 is shown between an empty state 912 and an occupied state 914 for the parking space.

FIG. 9B shows magnetometer data 920 under a second scenario in which a vehicle enters or leaves a parking space with an occupied adjacent spot. The magnetometer data 920 is shown between an empty state 922 and an occupied state 924 for the parking space. Note that the magnetometer data 920 of FIG. 9B is similar but not identical to the magnetometer data 910 of FIG. 9A.

Figures 9C, 9D:
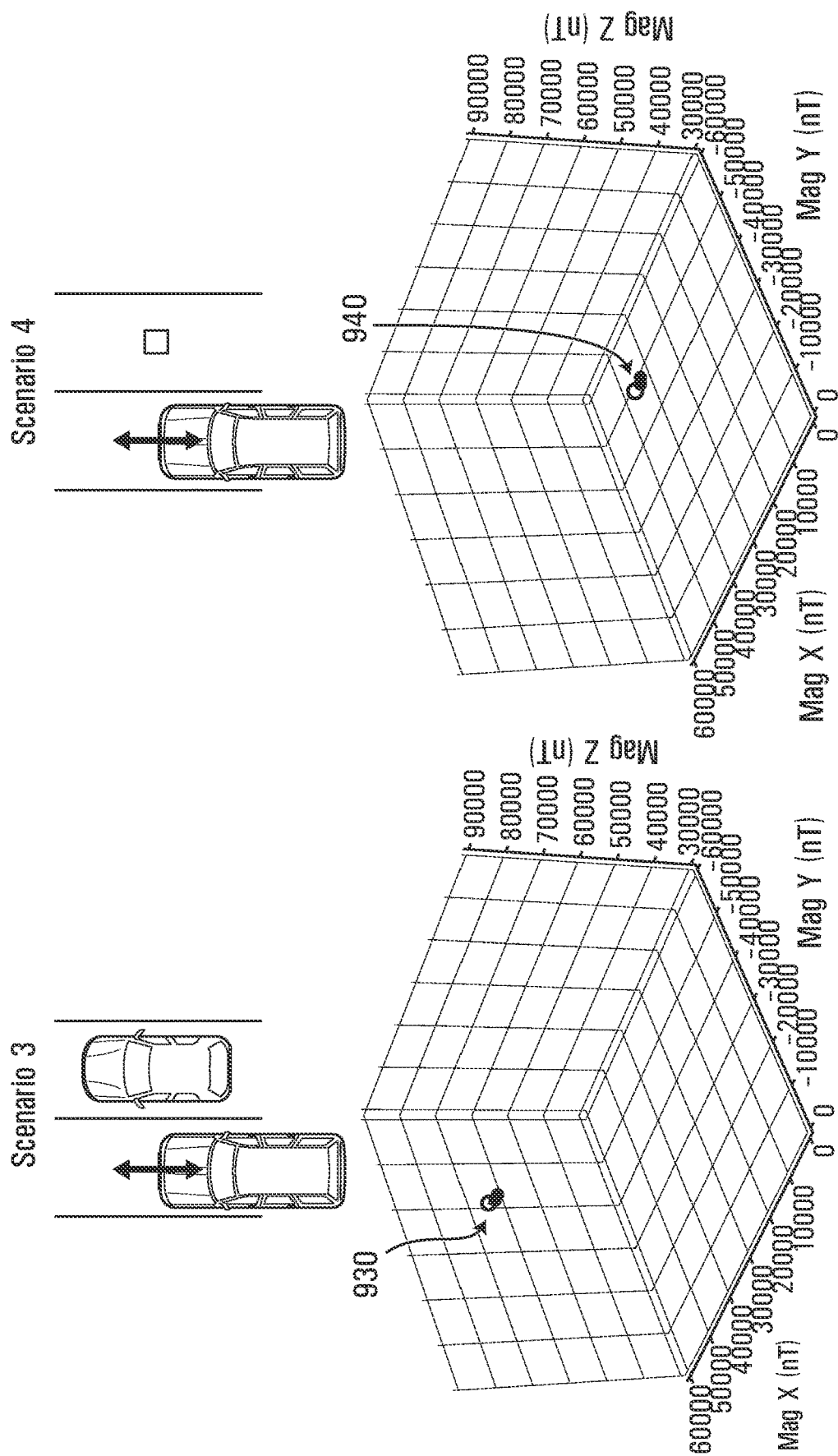

FIG. 9C shows magnetometer data 930 under a third scenario in which a vehicle remains in a parking space while a second vehicle enters or leaves an adjacent spot. The magnetometer data 930 is substantially steady-state for the parking space being occupied because the magnetometer data 930 is largely unaffected by the second vehicle entering or leaving the adjacent spot.

FIG. 9D shows magnetometer data 940 under a fourth scenario in which a parking space remains empty while a vehicle enters or leaves an adjacent spot. The magnetometer data 940 is substantially steady-state for the parking space being empty because the magnetometer data 940 is largely unaffected by the vehicle entering or leaving the adjacent spot.

The magnetometer sensor measures in a 3D space and gives three vector (x,y,z) readings. In some implementations, thresholds are set to be the same in all three directions. In other implementations, different thresholds are used for each direction.

In some implementations, two thresholds are used for magnetometer data. The first threshold is a threshold set on each (x,y,z) axis that indicates how big a magnetometer change should wake-up the sensor and do the radar scans/steady state magnetometer data collection. The second threshold is related to using a steady-state mag data to determine if a vehicle is present. Here, the magnetometer data when the vehicle is stopped is collected and an average distance $sqrt(dx^2+dy^2+dz^2)$ to the stored vacant stall magnetometer values is compared. If this distance is above a threshold, the stall is considered occupied.

In some implementations, the parking sensor device provides electrical interference rejection. Nearby electrical wires can cause magnetic interference. In some implementations, the parking sensor device addresses magnetic interference by detection of magnetometer steady state (not a transient situation), detection of steady state noise, for example by using standard deviation, band pass filtering, FFT (fast Fourier transform), or other suitable signal processing techniques, noise frequency detection, for example by using FFT, and noise notch filtering.

Another Example Method for Determining Occupancy

Figure 10:
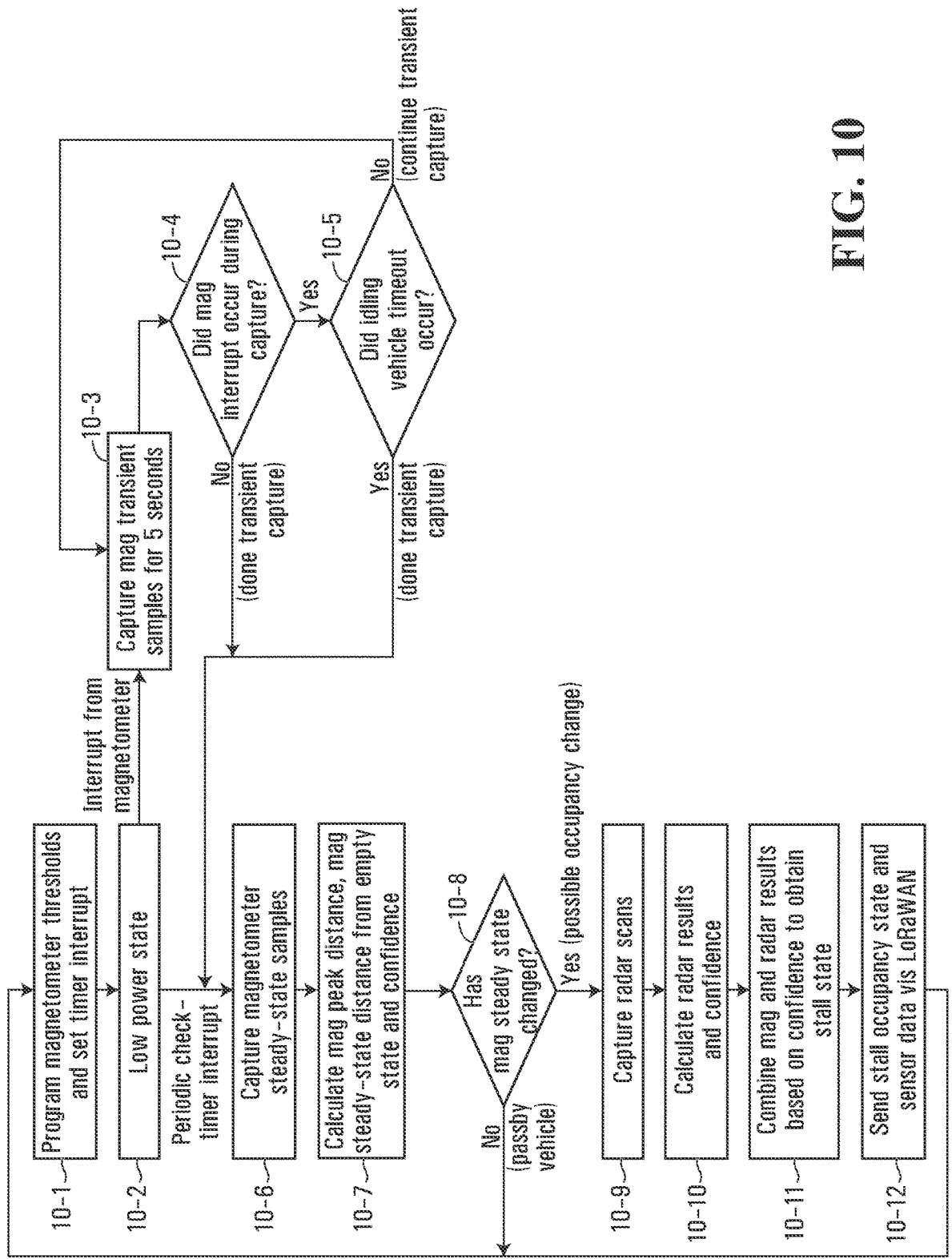
FIG. 10 is a flowchart of another example method for determining occupancy of a parking space.

Referring now to FIG. 10, shown is a flowchart of another example method for determining occupancy of a parking space. This method can be executed by control circuitry of a parking sensor device, for example by the low power MCU 510 of the parking sensor device 500 shown in FIG. 5, or by the control circuitry 230 of the parking sensor device 200 shown in FIG. 2. It is to be understood that the method is very specific and is provided merely as an example.

At step 10-1, the control circuitry programs magnetometer thresholds and sets a timer interrupt. The magnetometer thresholds are settings for triggering an interrupt from the magnetometer based on detecting a change of magnetic field, thereby triggering a radar scan as described below. The timer interrupt is utilized to periodically trigger a radar scan even if there is no interrupt from the magnetometer. At step 10-2, the control circuitry enters a low power state. It is possible that a majority of time is spent in the low power state to reduce power consumption.

Upon receiving an interrupt from the magnetometer, the control circuitry exits the low power state and captures transient magnetometer samples at step 10-3. The transient magnetometer samples are captured because there may be movement of a vehicle causing measurable changes in magnetic field. In some implementations, the transient magnetometer samples are captured for at least a defined time period, for example five seconds, which can enable capture of enough data while waiting for a vehicle (if any) to stop moving in or out of the parking space. In some implementations, the time period is extended whenever another interrupt from the magnetometer is received at step 10-4, unless an idling vehicle timeout occurs at step 10-5. This can allow for capture of additional data while a vehicle (if any) is moving, but also mitigate the capturing of data perpetually if the vehicle is not actually moving but is instead idling in or around the parking space.

After capturing the transient magnetometer samples, or after the timer interrupt, the control circuitry proceeds to steps 10-6 to 10-8 to determine whether there has been a steady-state change in magnetic field which can indicate a change in occupancy of the parking space. At step 10-6, the control circuitry collects steady-state magnetometer samples. At step 10-7, the control circuitry calculates a peak distance based on the magnetometer samples, which can be compared to a steady-state distance for an empty state. The control circuitry also calculates a confidence in the peak distance, for example between −100 to +100. At step 10-8, the control circuitry determines whether there has been a steady-state change in magnetic field by comparing the new steady state to the previously recorded steady state. The distance of the peak magnetic field deviation from the previously recorded steady-state magnetic field can be taken in consideration as well. If at step 10-8 there has been no steady-state change in magnetic field, then there is likely no change in occupancy of the parking space. In this situation, there may have been a false trigger by the magnetometer device, so the control circuitry can loop back to step 10-1 to adjust magnetometer thresholds with a view to avoiding another false trigger at a later time. This can help to avoid having to perform radar scans for passing cars or other phenomenon that may cause a transient change in magnetic field.

However, if at step 10-8 there has been a steady-state change in magnetic field, then the control circuitry continues onto steps 10-9 to 10-12 because there may be a change in occupancy of the parking space. At step 10-9, the control circuitry performs at least one radar scan using a radar sensor to obtain radar data. Note that the least one radar scan can include multiple different radar scans, including a water radar scan. An example of utilizing multiple different radar scans has been provided above with reference to FIGS. 6A and 6B and is not repeated here. Next, at step 10-10, the control circuitry processes the radar data and calculates a confidence, for example between −100 to +100. At step 10-11, the control circuitry combines the magnetometer samples and the radar data based on the confidence to determine occupancy of the parking space. For example, the control circuitry can generate a confidence weighted combination of the magnetometer samples and the radar data. Finally, at step 10-12, the control circuitry conveys the occupancy, for example by transmitting a message containing an occupancy state to the LoRaWAN gateway. Optionally, the message can also include sensor data such as the magnetometer samples and the radar data.

The method described above with reference to FIGS. 6A and 6B uses a radar water scan to determine whether radar is blocked by water and then decides to use the magnetometer and/or the radar to determine occupancy. By contrast, the method described above with reference to FIG. 10 collects all radar and magnetometer data and then determines occupancy based on a combination of all the data. In addition, continuous magnetometer triggers from an idling car are handled forcing radar scans and stall state calculation after a timeout.

The radar water scan described above with reference to FIGS. 6A and 6B uses the peak of the reflection off the enclosure to determine if water is covering the sensor. This measured peak varies with temperature due to radar TX power and RX gain changes over temperature, so the measured peak can be scaled over temperature by a temperature coefficient. However, after characterizing the temperature coefficient of many devices, it has been found that many devices do not seem to have the same temperature coefficient. To avoid using a temperature coefficient, the control circuitry can start the RX earlier to see the direct TX-RX antenna leakage and measures a delta between the leakage and the reflection off the enclosure top. This measurement is independent of TX power or RX gain, so the control circuitry no longer needs to do temperature compensation for the measurement. This is explained in further detail below with reference to FIG. 11.

Figure 11:
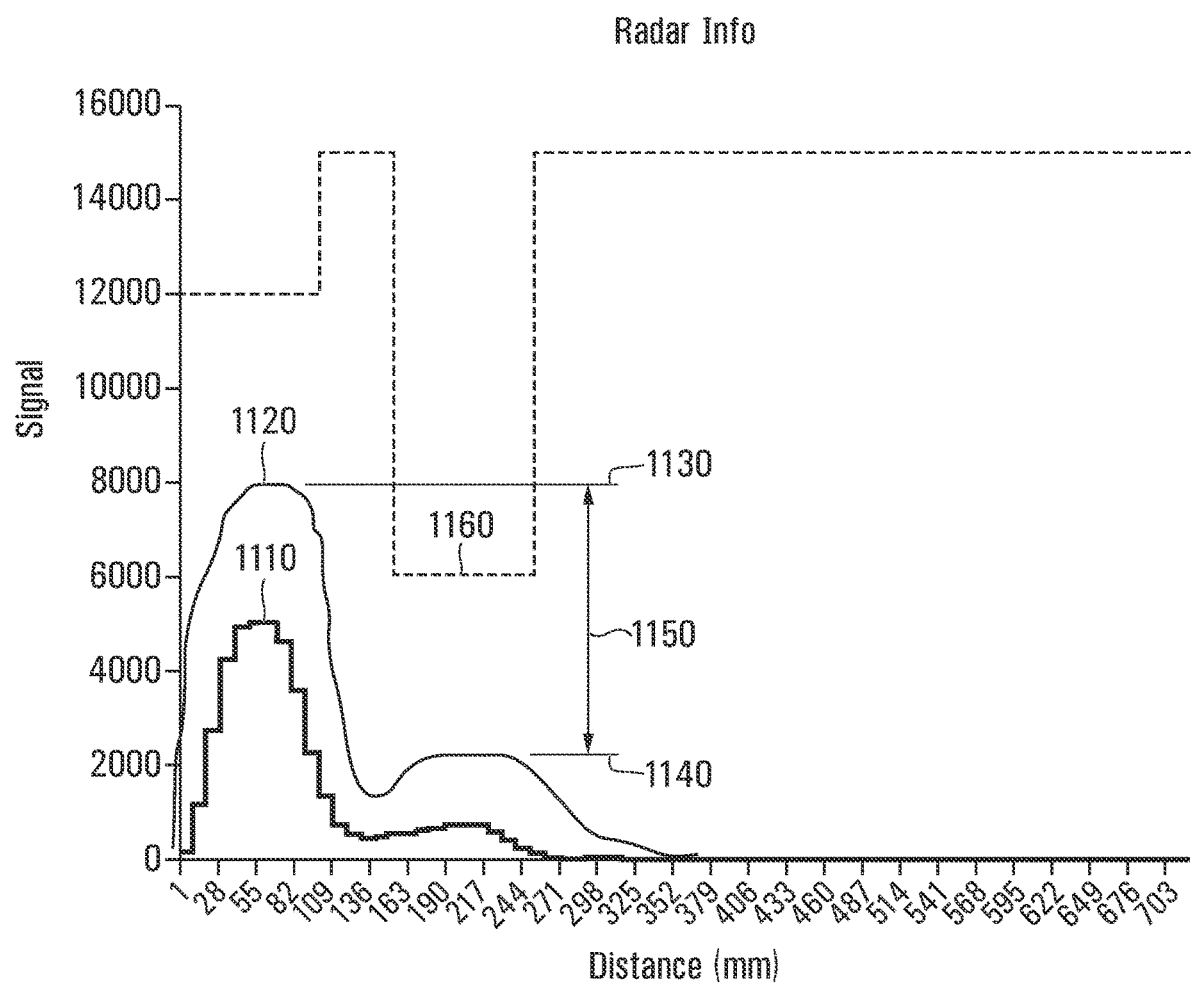
FIG. 11 is a graph of an example radar capture for surface water detection.

Referring now to FIG. 11, shown is a graph of an example radar capture for surface water detection. First, a radar capture starts at −2 cm to capture raw data 1110. Next, the raw data 1110 is scaled to produce scaled data 1120. In this illustrated example, the scaling is performed so that the scaled data 1120 has a TX-RX leakage peak 1130 of about 8000 units, although other scaling is possible. Note that the scaled data 1120 also has an enclosure reflection peak 1140 that has been scaled from the raw data 1110. A delta 1150 between the TX-RX leakage peak 1130 and the enclosure reflection peak 1140 is calculated for the scaled data 1120. Then, a third threshold 1160 for water scan is compared to the delta 1150 to determine presence of water. A higher enclosure reflection peak 1140 lowers the delta 1150 and indicates that water is present. Conversely, a lower enclosure reflection peak 1140 increases the delta 1150 and indicates that water is not present.

Notably, the delta 1150 is independent of changes in TX output power and RX gain over temperature. Thus, presence of water can be determined without measuring temperature. Rather, presence of water can be determined based on the delta 1150 between a first peak 1130 of the scaled data and the second peak 1140 of the scaled data. Also note that there may be very few false positives for detection of water. Thus, upon detecting water, radar results can be disregarded and parking stall state can be determined based on magnetometer measurements. However, if water is not detected (false negatives are possible, and sometimes detecting water is missed), weighted confidence scales of the radar scans and the magnetometer values are combined to determine the parking stall state.

In some implementations, there is provided a magnetometer empty state training procedure to train the magnetometer to properly produce interrupts when there may be a change in occupancy of the parking space. In some implementations, the training is performed with radar, upon both radar and magnetometer data indicating an empty state, then an occupied state, and then an empty state again. Such state sequence provides a high confidence of magnetometer empty state. In other implementations, the training is performed without radar, such that magnetometer data alone indicates an empty state, then an occupied state, then an empty state again, then an occupied state again, then an empty state again. It can take one more cycle than with radar to calibrate, but by observing the same empty state three times, there is a high confidence of magnetometer empty state.

In some implementations, there is provided magnetometer empty steady state filtering (i.e. smoothing). This may help to ensure that one false detect doesn't cause a big change in stored empty steady state. Without filtering, one false detect could put the control circuitry into a bad state. Neighboring cars can also shift the state a bit and an averaged empty state may give better results.

In some implementations, the control circuitry runs all scans and uses confidence in radar and magnetometer data to combine the radar and magnetometer data. The control circuitry calculates a confidence value, for example between −100 to +100, for all radar and magnetometer scans. In some implementations, the confidence values are summed or otherwise combined and a final result and final confidence value are produced.

In some implementations, there is provided an idling car (continuous mag trigger) timeout. This can help to ensure that an idling car doesn't block radar scans. The control circuitry can wait for a defined dime period, for example three minutes, for motion to stop. If it doesn't stop, then the control circuitry does a scan anyway and sends a report. Without this, the magnetometer could just continue to interrupt and a report could take a long time to send.

In some implementations, the control circuitry ignores a peak with a small mag steady state shift (roadside). No radar scans for passing cars if the magnetometer doesn't show a big shift. Without this, a report could be sent for every car that passes by.

In some implementations, there is provided small magnetometer delta cars (use mag transient peak). The threshold for a car is lowered if there is observed a clear empty state before hand and a large transient. Some cars have small signatures so this can help pick them up.

In some implementations, there is provided "New car" indicator bit for quick pull out/another car pull in. Send a flag indicating if there is a new car. If previously spot was empty this is set when a car enters. If the spot was occupied and is still occupied set the new car flag if a large transient was observed. This indicates the car moved and a new one entered in a short period of time.

In some implementations, there is provided noise floor thresholding (for far distances away from TX-RX leakage, TX-off to measure noise). The noise floor for the radar scans changes between radar chips and across temperatures. In order to be as sensitive to radar targets as possible, the noise floor can be determined for the current conditions. For example, before each vehicle scan, there can be a scan for radar without transmitting to get the current noise floor. This measured noise floor can be used at farther distances because at the close distances it is possible for radar transmission to leak directly to the receiver, which causes a bump that can look like a car. For close distances a set static threshold can be used.

In some implementations, there is provided radar retry for small confidence signals (e.g. reject peaks that move more than 5 cm). If the radar detects a target but it has very low confidence (only slightly over the threshold), then this may be a false detect caused by random noise. When this happens, a scan for a second time can be done. If the peak is still over the threshold and at the same distance this means that it may be a real detection and not noise. This can help increase the accuracy while keeping high sensitivity.

ALTERNATIVE EMBODIMENT

In another embodiment of the disclosure, rather than the control circuitry of the parking sensor device determining occupancy of the parking space, the control circuitry obtains readings from the magnetometer sensor and the radar sensor, and the output conveys the readings. In this way, the parking sensor device can function as a conduit for the readings from the magnetometer sensor and the radar sensor, and a server instead determines occupancy of the parking space based on the readings. The server can still convey occupancy of parking spaces to one or more client devices, for example through a web interface, as previously described.

Potential benefits of have a cloud server decide the occupancy is that it can use all the historical data from the sensor to improve current decisions through big data and machine learning techniques. For example, it can compare a new set of sensor data against all previous "empty" states to see how it compares and guide its decision. Also, because the server knows the state for the surround parking stalls it can take that into account when evaluating the sensor data. For example, it is known that vehicles in adjacent stall can affect a magnetometer, so for two stalls side by side (stall1 and stall2), if a vehicle enters stall1 but this causes the magnetometer in stall2 to trigger, the service will receive information from both sensors and know that stall2 has not really changed state.

In some implementations, there is provided consideration for a large magnetometer affecting nearby stalls (e.g. invalidate adjacent stall mag on back-end). Some cars seem to have an extremely large mag signature, sometimes 10× more than average. A mag signature can be so large that neighboring spots think there is a car there too. In these cases it may be impractical to rely on the magnetometer readings in neighboring spots. The cloud server may know the proximity of parking space based on a parking space map. When a large magnetic field is reported, the cloud server can invalidate magnetometer readings in neighbouring spaces and use radar only in these spots. In this way, the cloud server can determine occupancy of a parking space based on a combination of (i) readings from a magnetometer sensor and/or a radar sensor associated with that parking space, and (i) readings from a magnetometer sensor and/or a radar sensor associated with another parking space (e.g. adjacent or nearby parking space).

According to another embodiment of the disclosure, there is provided a server having a network adapter and vehicle presence circuitry coupled to the network adapter. The vehicle presence circuitry is configured to (i) receive, via the network adapter, a message having readings from a magnetometer sensor and a radar sensor, (ii) determine occupancy of a parking space based on the readings from the magnetometer sensor and the radar sensor, and (iii) send, via the network adapter, a message indicating occupancy of the parking space.

Examples of how occupancy of a parking space can be determined based on sensor data for the parking space have been provided and are not repeated here. In addition, as noted above, sensor data from adjacent or nearby parking spaces can optionally be considered as well.

There are many possibilities for the vehicle presence circuitry of the server. In some implementations, the vehicle presence circuitry includes a processor, and the server has a non-transitory computer readable medium having recorded thereon statements and instructions that, when executed by the processor, configures the processor as the vehicle presence circuitry. In other implementations, vehicle presence circuitry includes an FPGA or an ASIC. Other implementations are possible and are within the scope of the disclosure.

Numerous modifications and variations of the present disclosure are possible in light of the above teachings. It is therefore to be understood that within the scope of the appended claims, the disclosure may be practised otherwise than as specifically described herein.

We claim:

1. A parking sensor device for determining occupancy of a parking space, comprising:
    a magnetometer sensor configured to detect a magnetic field;
    a radar sensor configured to perform at least one radar scan to detect presence of an object;
    control circuitry configured to determine whether the object detected by the at least one radar scan includes a blocking substance near the parking sensor device, and determine occupancy of the parking space based on the magnetic field and the at least one radar scan as a function whether a blocking substance is detected;
    a structure positioned relative to the radar sensor so that the at least one radar scan traverses the structure, wherein the structure is configured with a shape and a dielectric constant that slows down the at least one radar scan to enable detection of a blocking substance by separating reflection off the blocking substance from internal direct leakage; and
    an output for conveying occupancy of the parking space.

2. The parking sensor device of claim 1, wherein the output comprises:
    a wireless transmitter configured to transmit a wireless message indicating occupancy in the parking space.

3. The parking sensor device of claim 2, wherein the wireless message comprises readings from the magnetometer sensor and the radar sensor.

4. The parking sensor device of claim 3, further comprising:
    maintaining a configuration of how occupancy is determined based on the magnetic field and the at least one radar scan;
    receiving feedback after conveying occupancy of the parking space; and
    adjusting the configuration based on the feedback.

5. The parking sensor device of claim 2, wherein the control circuitry is configured to transition from a low power state to an operating state upon the magnetometer sensor detecting a change in the magnetic field, and to transition back to the low power state after triggering the wireless transmitter to transmit the wireless message.

6. The parking sensor device of claim 1, wherein the control circuitry is configured to determine occupancy of the parking space by:
    when a blocking substance is detected, determining occupancy of the parking space based on the magnetic field.

7. The parking sensor device of claim 1, wherein the control circuitry is configured to determine occupancy of the parking space by:
    when no blocking substance is detected, determining occupancy of the parking space based on a combination of the magnetic field and the at least one radar scan.

8. The parking sensor device of claim 7, wherein determining occupancy of the parking space based on the combination of the magnetic field and the at least one radar scan comprises:
    determining a confidence for each of the magnetic field and radar data of the at least one radar scan; and
    determining occupancy of the parking space based on a confidence weighted combination of the magnetic field and the radar data.

9. The parking sensor device of claim 1, further comprising:
    a BLE (Bluetooth Low Energy) radio configured to wirelessly connect to another parking sensor device and/or a mobile wireless device.

10. The parking sensor device of claim 1, wherein the control circuitry comprises a microcontroller coupled to the magnetometer sensor, the radar sensor, and the output.

11. The parking sensor device of claim 1, wherein the shape of the structure comprises of a cone or a frustum.

12. A parking sensor device for determining occupancy of a parking space, comprising:
    a magnetometer sensor configured to detect a magnetic field;
    a radar sensor configured to perform at least one radar scan to detect presence of an object;
    control circuitry configured to determine whether the object detected by the at least one radar scan includes a blocking substance near the parking sensor device, and determine occupancy of the parking space based on the magnetic field and the at least one radar scan as a function whether a blocking substance is detected; and
    an output for conveying occupancy of the parking space, wherein the at least one radar scan produces raw data, and the control circuitry is configured to scale the raw data to produce scaled data, and to detect presence of the blocking substance based on a delta between a first peak of the scaled data and a second peak of the scaled data.

13. A method for determining occupancy of a parking space, comprising:
    detecting a magnetic field;
    performing at least one radar scan to detect presence of an object;

determining whether the object detected by the at least one radar scan includes a blocking substance;

determining occupancy of the parking space based on the magnetic field and the at least one radar scan as a function whether a blocking substance is detected; and conveying occupancy of the parking space, wherein the at least one radar scan produces raw data, and the method comprises scaling the raw data to produce scaled data, and detecting presence of the blocking substance based on a delta between a first peak of the scaled data and a second peak of the scaled data.

14. The method of claim 13, wherein determining occupancy of the parking space comprises:

when a blocking substance is detected, determining occupancy of the parking space based on the magnetic field.

15. The method of claim 13, wherein determining occupancy of the parking space comprises:

when no blocking substance is detected, determining occupancy of the parking space based on a combination of the magnetic field and the at least one radar scan.

16. The method of claim 15, wherein determining occupancy of the parking space based on the combination of the magnetic field and the at least one radar scan comprises:

determining a confidence for each of the magnetic field and radar data of the at least one radar scan; and determining occupancy of the parking space based on a confidence weighted combination of the magnetic field and the radar data.

17. A non-transitory computer readable medium having recorded thereon statements and instructions that, when executed by a processor of a parking sensor device, implement the method of claim 13.

18. A parking sensor device, comprising:

a magnetometer sensor configured to detect a magnetic field;

a radar sensor configured to perform at least one radar scan to detect presence of an object;

a structure positioned relative to the radar sensor so that the at least one radar scan traverses the structure;

control circuitry configured to obtain readings from the magnetometer sensor and the radar sensor; and an output for conveying the readings from the magnetometer sensor and the radar sensor;

wherein the structure is configured with a shape and a dielectric constant that slows down the at least one radar scan to enable detection of whether the object includes a blocking substance by separating reflection off the blocking substance from internal direct leakage.

* * * * *